(12) United States Patent
Regalbuto et al.

(10) Patent No.: US 12,155,916 B2
(45) Date of Patent: Nov. 26, 2024

(54) VEHICLE SENSOR ASSEMBLY

(71) Applicant: Ford Global Technologies, LLC, Dearborn, MI (US)

(72) Inventors: Anthony Michael Regalbuto, Highland, MI (US); Venkatesh Krishnan, Canton, MI (US); Kunal Chaudhari, Westland, MI (US); Michael Robertson, Jr., Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 17/745,981

(22) Filed: May 17, 2022

(65) Prior Publication Data
US 2023/0379560 A1  Nov. 23, 2023

(51) Int. Cl.
| | | |
|---|---|---|
| H04N 23/52 | (2023.01) | |
| B60S 1/54 | (2006.01) | |
| G01S 7/497 | (2006.01) | |
| H04N 23/51 | (2023.01) | |
| H04N 23/90 | (2023.01) | |
| B60S 1/56 | (2006.01) | |

(52) U.S. Cl.
CPC ............... *H04N 23/52* (2023.01); *B60S 1/54* (2013.01); *G01S 7/497* (2013.01); *H04N 23/51* (2023.01); *H04N 23/90* (2023.01); *B60S 1/56* (2013.01); *G01S 2007/4977* (2013.01)

(58) Field of Classification Search
CPC ........... B60R 11/04; B60R 1/00; B60R 1/006; B60R 1/06; B60R 1/10; B60R 2011/004; B08B 5/02; B62D 21/17; B62D 25/16; F28F 3/025; G01C 21/36; H04N 23/51; B60H 1/00735; B60H 1/00742; B60H 1/00849; B60H 2001/00135; B60H 1/00; B60H 1/00064; B60H 1/00807; B60H 1/00828; B60H 1/00478
USPC ........................................................ 348/148
See application file for complete search history.

(56) References Cited

U.S. PATENT DOCUMENTS

| | | | |
|---|---|---|---|
| 8,671,504 B2 | 3/2014 | Ono et al. | |
| 10,807,569 B2 | 10/2020 | Ghannam et al. | |
| 2003/0155001 A1 | 8/2003 | Hoetzer et al. | |
| 2009/0250533 A1 | 10/2009 | Akiyama et al. | |
| 2018/0272996 A1* | 9/2018 | Nielsen | B60S 1/52 |
| 2019/0184942 A1 | 6/2019 | Vaishnav et al. | |
| 2021/0025983 A1* | 1/2021 | Patil | G02B 27/0006 |
| 2021/0063540 A1* | 3/2021 | Krishnan | G01S 7/4813 |

FOREIGN PATENT DOCUMENTS

CA  2843453 A1  8/2015

* cited by examiner

*Primary Examiner* — Masum Billah
(74) *Attorney, Agent, or Firm* — Frank A. Mackenzie; Bejin Bieneman PLC

(57) ABSTRACT

A vehicle includes a window; a sensor housing including an air inlet, a first air outlet, and a second air outlet; an image sensor supported by the sensor housing; and a blower positioned to draw in air through the air inlet and expel the air through the first air outlet and the second air outlet. The first air outlet is aimed at the image sensor, and the second air outlet is aimed at the window.

18 Claims, 4 Drawing Sheets

VEHICLE SENSOR ASSEMBLY

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
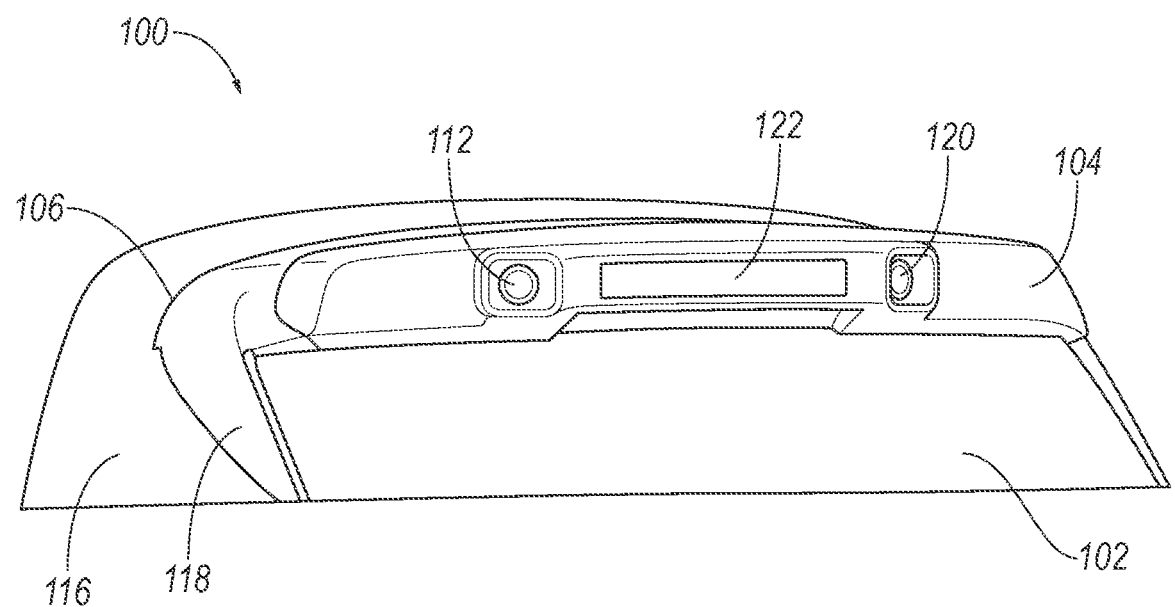
FIG. 1 is a rear perspective view of a portion of an example vehicle.

A vehicle includes a window; a sensor housing including an air inlet, a first air outlet, and a second air outlet; an image sensor supported by the sensor housing; and a blower positioned to draw in air through the air inlet and expel the air through the first air outlet and the second air outlet. The first air outlet being aimed at the image sensor, and the second air outlet being aimed at the window.

The image sensor may be between the air inlet and the blower such that air drawn in by the blower flows across the image sensor from the air inlet to the blower. The image sensor may include a plurality of thermal fins, and the thermal fins may be positioned in an airflow path from the air inlet to the blower.

The vehicle may further include a duct in the sensor housing extending from the blower to the first air outlet. The duct may be a first duct, the image sensor may be a first image sensor, and the vehicle may further include a second image sensor supported by the sensor housing, the sensor housing including a third air outlet aimed at the second image sensor; and a second duct in the sensor housing extending from the blower to the third air outlet. The first duct and the second duct may be elongated in opposite directions from the blower.

The duct may be elongated parallel to the window.

The image sensor may be a first image sensor, the vehicle may further include a second image sensor supported by the sensor housing, the sensor housing may include a third air outlet aimed at the second image sensor, and the blower may be positioned to expel air through the third air outlet. The first image sensor, the second image sensor, and the blower may be arranged collinearly with the blower between the first image sensor and the second image sensor. The air inlet may be a first air inlet, the sensor housing may include a second air inlet, the blower may be positioned to draw in air through the second air inlet, the first image sensor may be between the first air inlet and the blower such that air drawn in by the blower flows across the first image sensor from the first air inlet to the blower, and the second image sensor may be between the second air inlet and the blower such that air drawn in by the blower flows across the second image sensor from the second air inlet to the blower.

Substantially all air expelled by the blower may be expelled through the first air outlet, the second air outlet, or the third air outlet.

The second air outlet may be elongated parallel to the window. The second air outlet may include a plurality of nozzles aimed transverse to the direction of elongation of the second air outlet and aimed at the window.

The sensor housing may be above the window.

The window may be a rear windshield. The vehicle may further include a center high-mounted stop lamp positioned between the sensor housing and the window.

The vehicle may further include a liftgate that supports the window and the sensor housing.

The image sensor may be a camera. The image sensor may include a lens, and the first air outlet may be aimed at the lens. The sensor housing may include an aperture, the image sensor may have a field of view through the aperture, and the first air outlet may be aimed through the aperture.

With reference to the Figures, wherein like numerals indicate like parts throughout the several views, a vehicle 100 includes a window 102; a sensor housing 104 including a first air inlet 106, a first air outlet 108, and a second air outlet 110; a first image sensor 112 supported by the sensor housing 104; and a blower 114 positioned to draw in air through the first air inlet 106 and expel the air through the first air outlet 108 and the second air outlet 110. The first air outlet 108 is aimed at the first image sensor 112, and the second air outlet 110 is aimed at the window 102.

The vehicle 100 can provide cleaning for the first image sensor 112 and for the window 102 from one blower 114. The airflow across the first image sensor 112 can help remove dust and debris from the first image sensor 112 as well as helping prevent rain, debris, etc. from landing on the first image sensor 112, increasing an accuracy of data generated by the first image sensor 112. The airflow across the window 102 can reduce a quantity of dust or dirt that settles on the window 102. Providing the airflow for both the first image sensor 112 and the window 102 from a single blower 114 can make it easier to modulate the amount of airflow provided, e.g., a standard-sized blower 114 can be used that would expel more airflow than is needed for cleaning the first image sensor 112 because the additional airflow is directed to the window 102.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a body 116. The vehicle 100 may be of a unibody construction, in which a frame and the body 116 of the vehicle 100 are a single component. The vehicle 100 may, alternatively, be of a body-on-frame construction, in which the frame supports the body 116 that is a separate component from the frame. The frame and body 116 may be formed of any suitable material, for example, steel, aluminum, etc.

The vehicle 100 can include a liftgate 118, e.g., a rear liftgate, that supports the window 102 and the sensor housing 104. The liftgate 118 can be hingedly coupled to the body 116, e.g., at a rear edge of a roof of the vehicle 100. The liftgate 118 can be rotatable relative to the body 116 between a closed position as shown in FIG. 1 and an open position permitting access to a rear storage area of the vehicle 100 (not shown).

The vehicle 100 includes the window 102. The window 102 is positioned to permit an occupant of the vehicle 100 to view outside the vehicle 100. The window 102 can be a rear windshield, i.e., facing rearward relative to a forward direction of travel of the vehicle 100. A rear windshield is typically positioned in a low-pressure zone when the vehicle 100 is traveling forward, meaning that dust is more likely to settle on the window 102. The airflow provided to the window 102 as described below is thus more beneficial when the window 102 is a rear windshield. The window 102 can be supported by the liftgate 118, e.g., fixed relative to the liftgate 118 and bordered by the liftgate 118. The liftgate 118 can extend fully around the edges of the window 102. The window 102 can be positioned in a top half of the liftgate 118. The window 102 may be formed of any suitably durable transparent material, including glass such as laminated, tempered glass or plastic such as Plexiglas® or polycarbonate.

The vehicle 100 includes the sensor housing 104. The sensor housing 104 can be positioned above the window 102. For example, the sensor housing 104 can be supported by the liftgate 118 and attached to the liftgate 118 at a top of the liftgate 118. The high position of the sensor housing 104 can provide the first image sensor 112 and a second image sensor 120 a better vantage point for viewing an environment around the vehicle 100. The sensor housing 104 can be elongated laterally relative to the vehicle 100, e.g., across a full width of the liftgate 118.

The vehicle 100 can include a center high-mounted stop lamp (CHMSL) 122 positioned between the sensor housing 104 and the window 102. The CHMSL 122 can include a lamp and a cover extending over the lamp that is transparent and tinted red. The lamp of the CHMSL 122 can be illuminated in response to braking of the vehicle 100.

Figure 2:
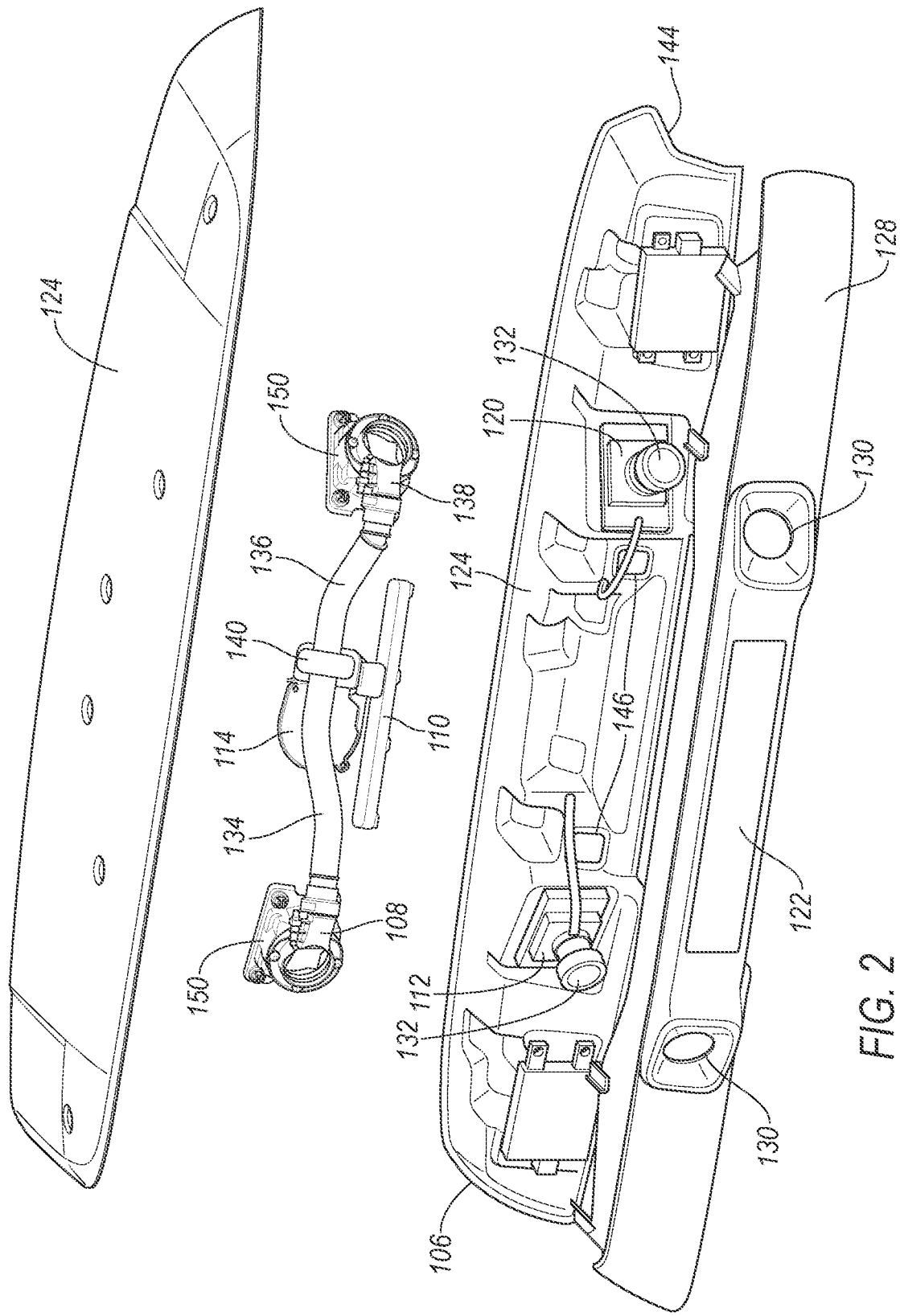
FIG. 2 is a perspective exploded view of a sensor housing of the vehicle.

With reference to FIG. 2, the sensor housing 104 can include an internal panel 124, a top panel 126, and a sensor panel 128. The internal panel 124 can be supported by the body 116 of the vehicle 100. The internal panel 124 can be concealed by the top panel 126 and the sensor panel 128. The top panel 126 can be positioned above the internal panel 124, and the sensor panel 128 can be positioned rearward from the internal panel 124. The top panel 126 and the sensor panel 128 may present a class-A surface, e.g., a finished surface exposed to view by a customer and free of unaesthetic blemishes and defects, e.g., matching the body 116 of the vehicle 100.

The vehicle 100 can include the first image sensor 112 and the second image sensor 120. The first image sensor 112 and the second image sensor 120 can be supported by the sensor housing 104 and contained in the sensor housing 104. The first image sensor 112 and the second image sensor 120 can be mounted, e.g., bolted, to the internal panel 124. The first image sensor 112 and the second image sensor 120 may extend through the internal panel 124. The top panel 126 can extend above the first image sensor 112 and the second image sensor 120, and the sensor panel 128 can extend behind the first image sensor 112 and the second image sensor 120 relative to the body 116.

The first image sensor 112 and the second image sensor 120 can be cameras and can detect electromagnetic radiation in some range of wavelengths. For example, the first image sensor 112 and the second image sensor 120 may detect visible light, infrared radiation, ultraviolet light, or some range of wavelengths including visible, infrared, and/or ultraviolet light. For example, the cameras can be a charge-coupled devices (CCD), complementary metal oxide semiconductors (CMOS), or any other suitable type. The first image sensor 112 and the second image sensor 120 can each include a lens 132. Alternatively, the first image sensor 112 and the second image sensor 120 may be LIDAR devices, e.g., scanning LIDAR devices. A LIDAR device detects distances to objects by emitting laser pulses at a particular wavelength and measuring the time of flight for the pulse to travel to the object and back.

The sensor housing 104, e.g., the sensor panel 128, can include apertures 130. The apertures 130 are holes in the sensor housing 104 leading from an interior space to the ambient environment. The apertures 130 are through the sensor housing 104, e.g., the sensor panel 128. The apertures 130 are circular in shape. The sensor housing 104 includes one aperture 130 for each of the first image sensor 112 and the second sensor. Each of the first image sensor 112 and the second image sensor 120 has a field of view defined by the respective lens 132 through the respective aperture 130 through the sensor housing 104. Each lens 132 can define an axis on which the respective aperture 130 is centered, i.e., the axis passes through a geometric center of a shape formed by the respective aperture 130. The aperture 130 can have a circular shape that is orthogonal to the axis.

The vehicle 100 includes the blower 114. The blower 114 can be supported by the sensor housing 104, contained in the sensor housing 104, and concealed by the sensor housing 104. The blower 114 can be mounted, e.g., bolted, to the internal panel 124. The first image sensor 112, the second image sensor 120, and the blower 114 can be arranged collinearly with the blower 114 between the first image sensor 112 and the second image sensor 120. This arrangement can provide a wider collective field of view to the first image sensor 112 and the second image sensor 120 while providing short paths for the blower 114 to supply airflow to the first image sensor 112 and the second image sensor 120.

Figure 3:
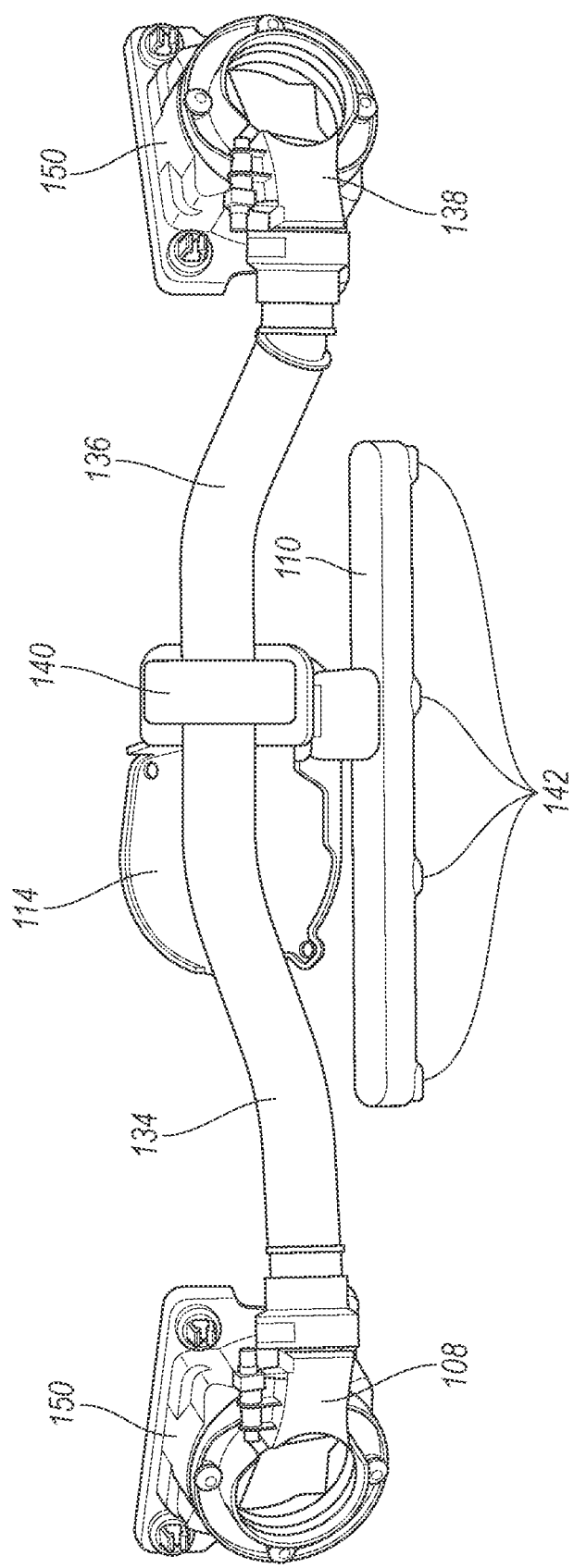
FIG. 3 is a plan view of a blower and air outlets of the vehicle.

With reference to FIG. 3, the blower 114 increases the pressure of a gas by reducing a volume of the gas or by forcing additional gas into a constant volume. The blower 114 may be any suitable type, e.g., positive-displacement such as a reciprocating, ionic liquid piston, rotary screw, rotary vane, rolling piston, scroll, or diaphragm; dynamic such as an air bubble, centrifugal, diagonal, mixed-flow, or axial-flow; or any other suitable type.

The vehicle 100 can include a manifold 140 positioned at an outlet of the blower 114. The manifold 140 is positioned to receive air expelled by the blower 114, e.g., substantially all air expelled by the blower 114. For the purposes of this disclosure, "substantially all air" means all air other than unintended leakage, e.g., at joints. The manifold 140 can divide the airflow into multiple paths, e.g., three paths to supply to the first image sensor 112, the second image sensor 120, and the window 102, respectively.

The vehicle 100 can include a first duct 134 and a second duct 136. The first duct 134 can extend from the blower 114, e.g., from the manifold 140, to the first air outlet 108, and the first duct 134 can guide airflow expelled by the blower 114 through the manifold 140 to the first air outlet 108. The second duct 136 can extend from the blower 114, e.g., from the manifold 140, to a third air outlet 138 of the sensor housing 104, and the second duct 136 can guide airflow expelled by the blower 114 through the manifold 140 to the third air outlet 138. The first duct 134 and the second duct 136 are contained in the sensor housing 104. The first duct 134 and the second duct 136 can be elongated in opposite directions from the blower 114, e.g., from the manifold 140.

For example, the first duct 134 can be elongated leftward relative to a forward direction of travel of the vehicle 100 from the blower 114, and the second duct 136 can be elongated rightward relative to the forward direction of travel of the vehicle 100 from the blower 114. The first duct 134 and the second duct 136 can be elongated parallel to the window 102, i.e., parallel to a plane defined by the window 102, e.g., parallel to an edge of the window 102, as seen in FIG. 2. For example, the first duct 134 and the second duct 136 can be elongated horizontally in a cross-vehicle direction.

Figure 4:
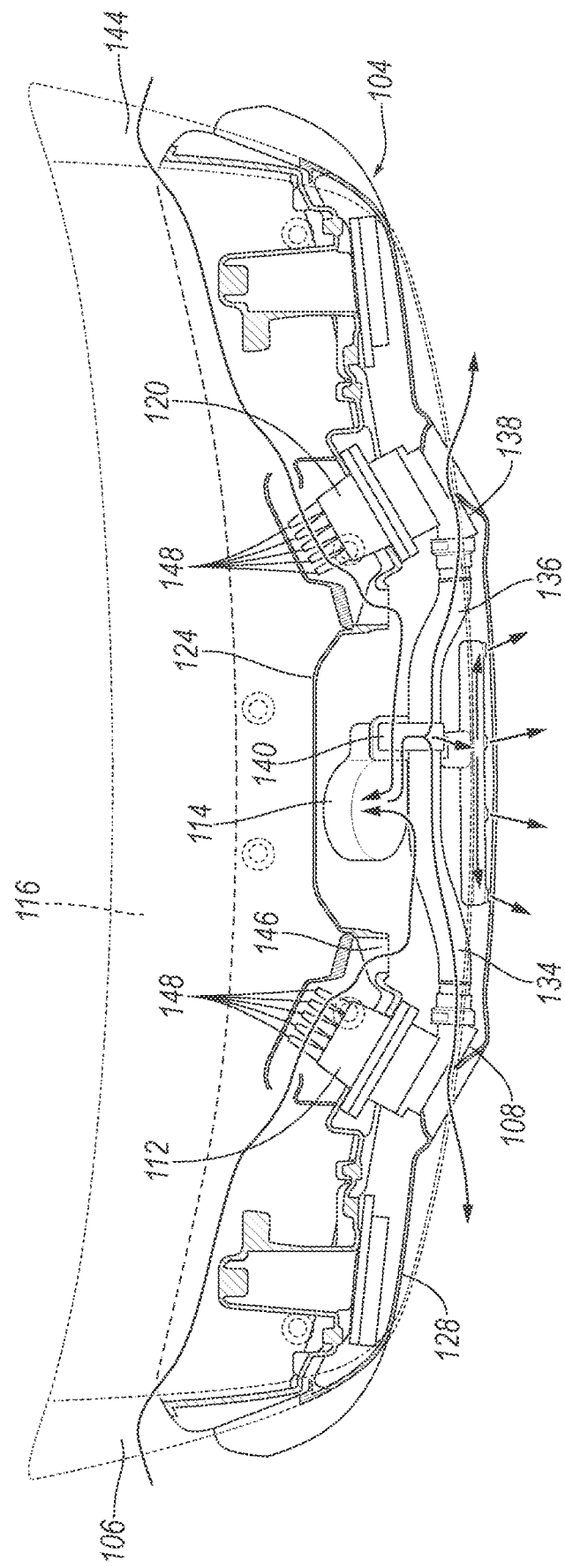
FIG. 4 is a top view of the sensor housing.

The sensor housing 104 can include the first air outlet 108 and the third air outlet 138. The first air outlet 108 is aimed at the first image sensor 112, e.g., at the lens 132 of the first image sensor 112. The third air outlet 138 is aimed at the second image sensor 120, e.g., at the lens 132 of the second image sensor 120. The first air outlet 108 and the third air outlet 138 can be aimed in generally horizontal, outboard directions, i.e., in respective directions that are horizontal and away from a midline of the body 116 of the vehicle 100, e.g., leftward for the first air outlet 108 and rightward for the third air outlet 138. The first air outlet 108 and the third air outlet 138 are aimed through the respective apertures 130, as shown in FIG. 4. For example, the first air outlet 108 and the third air outlet 138 can be partially formed by the sensor panel 128 at the respective apertures 130, or the first air outlet 108 and the third air outlet 138 can be separate pieces fixed immediately underneath the respective apertures 130, e.g., positioned between the sensor panel 128 and the respective lenses 132 along the axes defined by the lenses 132. The first air outlet 108 and the third air outlet 138 can be attached, e.g., fastened, snapped, or adhered, to respective casings 150 that extend around respective barrels of the first image sensor 112 and the second image sensor 120. The airflow that the first air outlet 108 receives from the first duct 134 and that the third air outlet 138 receives from the second duct 136 exits to the ambient environment through the apertures 130.

The sensor housing 104 includes the second air outlet 110. The second air outlet 110 can be positioned above the window 102 and can be centered laterally with respect to the body 116. The second air outlet 110 can be mounted to the manifold 140 below the manifold 140. The second air outlet 110 can be positioned to receive air expelled by the blower 114 into the manifold 140. The second air outlet 110 is aimed at the window 102. The second air outlet 110 can be elongated parallel to the window 102, i.e., parallel to a plane defined by the window 102, e.g., parallel to an edge of the window 102. For example, the second air outlet 110 can be elongated horizontally in a cross-vehicle direction. The second air outlet 110 can be elongated transverse to a direction that the second air outlet 110 is aimed, i.e., transverse to a direction of airflow exiting the second air outlet 110. For example, the second air outlet 110 can include a plurality of nozzles 142 aimed transverse to the direction of elongation and aimed at the window 102, e.g., aimed downward. The nozzles 142 can be arranged in a row along the direction of elongation, e.g., laterally across the vehicle 100.

The blower 114 is positioned to expel air through the first air outlet 108, the second air outlet 110, and the third air outlet 138. Substantially all air expelled by the blower 114 can be expelled through the first air outlet 108, the second air outlet 110, or the third air outlet 138. For example, the manifold 140 can be sealed to the blower 114 over an only outlet of the blower 114. The manifold 140 can have three outlets, and the first duct 134, the second duct 136, and the second air outlet 110 can be sealed over the respective outlets of the manifold 140. The first duct 134 can be arranged to guide the air received from the manifold 140 to the first air outlet 108. The second duct 136 can be arranged to guide the air received from the manifold 140 to the third air outlet 138.

With reference to FIG. 4, the sensor outlet can include the first air inlet 106 and a second air inlet 144. The first air inlet 106 and the second air inlet 144 can be arranged to permit air to enter the sensor housing 104 from the ambient environment. The first air inlet 106 can be positioned at one terminus of the sensor housing 104 along the direction of elongation of the sensor housing 104, and the second air inlet 144 can be positioned at an opposite terminus of the sensor housing 104 along the direction of elongation of the sensor housing 104. The first air inlet 106 and the second air inlet 144 can be positioned to permit air to enter the sensor housing 104 from sides of the vehicle 100 rather than from behind the vehicle 100, where the pressure may be lower.

The sensor housing 104 can be shaped to define airflow paths from the first air inlet 106 to the blower 114 and from the second air inlet 144 to the blower 114. For example, the internal panel 124 and the body 116 can define passageways from the first air inlet 106 and the second air inlet 144 in respective inboard directions to openings 146 of the internal panel 124, and the internal panel 124, top panel 126, and sensor panel 128 can define passageways from the openings 146 in the inboard directions to an inlet of the blower 114. The blower 114 is positioned to draw in air through the first air inlet 106 and second air inlet 144 through the passageways to the inlet of the blower 114.

The first image sensor 112 is positioned between the first air inlet 106 and the blower 114 such that the air drawn in by the blower 114 flows across the first image sensor 112 from the first air inlet 106 to the blower 114. For example, the first image sensor 112 can extend through the internal panel 124 into the passageway defined by the internal panel 124 and the body 116. The first image sensor 112 can be positioned outboard from the respective opening 146 through the internal panel 124. The second image sensor 120 is positioned between the second air inlet 144 and the blower 114 such that the air drawn in by the blower 114 flows across the second image sensor 120 from the second air inlet 144 to the blower 114. For example, the second image sensor 120 can extend through the internal panel 124 into the passageway defined by the internal panel 124 and the body 116. The second image sensor 120 can be positioned outboard from the respective opening 146 through the internal panel 124.

The first image sensor 112 and the second image sensor 120 can each include a plurality of thermal fins 148. The thermal fins 148 can be elongated from the first image sensor 112 or second image sensor 120 parallel to the axis defined by the respective lens 132 in a direction opposite the field of view of the first image sensor 112 or second image sensor 120. The length of each thermal fin 148 can be significantly greater than the thickness of that thermal fin 148, e.g., more than twice as great. For example, the thermal fins 148 can be pin-shaped, as shown, or plate-shaped.

The thermal fins 148 can be positioned in the airflow paths from the first inlet or the second inlet to the blower 114. For example, the thermal fins 148 can extend through the internal panel 124 toward the body 116 of the vehicle 100 into one of the passageways defined by the internal panel 124 and the body 116, or the thermal fins 148 can be positioned entirely between the internal panel 124 and the body 116 in one of the passageways defined by the internal panel 124 and the body 116, as shown in FIG. 4. Each thermal fin 148 can be elongated in a direction transverse to a direction of air flowing across that thermal fin 148, e.g., perpendicular to the direction of air flowing across the thermal fin 148.

The thermal fins 148 can be thermally conductive, i.e., have a high thermal conductivity, e.g., a thermal conductivity equal to at least 15 watts per meter-Kelvin (W/(m K)), e.g., greater than 100 W/(m K), at 25° C. For example, the thermal fins 148 may be aluminum. The high thermal conductivity of the thermal fins 148 helps transfer away heat generated by the first image sensor 112 and the second image sensor 120 inside the sensor housing 104, as does the large surface area created by the geometry of the thermal fins 148.

The airflow generated by the blower 114 thus provides cooling to the first image sensor 112 and the second image sensor 120 while traveling to the blower 114 and provides cleaning to the first image sensor 112, the second image sensor 120, and the window 102 after exiting the blower 114. The rate of airflow needed for cooling the first image sensor 112 and second image sensor 120 is greater than the airflow needed for cleaning the first image sensor 112 and the second image sensor 120. Providing airflow for cleaning the window 102 provides a useful function for the extra airflow drawn in beyond the amount needed for cleaning the first image sensor 112 and the second image sensor 120.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A vehicle, comprising:
   a vehicle window positioned to permit an occupant of the vehicle to view outside the vehicle;
   a sensor housing including an air inlet, a first air outlet, a second air outlet, and a third air outlet;
   a first image sensor supported by the sensor housing;
   a second image sensor supported by the sensor housing; and
   a blower positioned to draw in air through the air inlet and expel the air through the first air outlet, the second air outlet, and the third air outlet;
   the first air outlet being aimed at the image sensor;
   the second air outlet being aimed at the vehicle window;
   the third air outlet being aimed at the second image sensor; and
   the first image sensor, the second image sensor, and the blower being arranged collinearly with the blower between the first image sensor and the second image sensor.

2. The vehicle of claim 1, wherein the first image sensor is between the air inlet and the blower such that air drawn in by the blower flows across the first image sensor from the air inlet to the blower.

3. The vehicle of claim 2, wherein the first image sensor includes a plurality of thermal fins, the thermal fins being positioned in an airflow path from the air inlet to the blower.

4. The vehicle of claim 1, further comprising a duct in the sensor housing extending from the blower to the first air outlet.

5. The vehicle of claim 4, wherein the duct is a first duct, the vehicle further comprising:
   a second duct in the sensor housing extending from the blower to the third air outlet.

6. The vehicle of claim 5, wherein the first duct and the second duct are elongated in opposite directions from the blower.

7. The vehicle of claim 4, wherein the duct is elongated parallel to the vehicle window.

8. The vehicle of claim 1, wherein the air inlet is a first air inlet, the sensor housing includes a second air inlet, the blower is positioned to draw in air through the second air inlet, the first image sensor is between the first air inlet and the blower such that air drawn in by the blower flows across the first image sensor from the first air inlet to the blower, and the second image sensor is between the second air inlet and the blower such that air drawn in by the blower flows across the second image sensor from the second air inlet to the blower.

9. The vehicle of claim 1, wherein substantially all air expelled by the blower is expelled through the first air outlet, the second air outlet, or the third air outlet.

10. The vehicle of claim 1, wherein the second air outlet is elongated parallel to the vehicle window.

11. The vehicle of claim 10, wherein the second air outlet includes a plurality of nozzles aimed transverse to the direction of elongation of the second air outlet and aimed at the vehicle window.

12. The vehicle of claim 1, wherein the sensor housing is above the vehicle window.

13. The vehicle of claim 1, wherein the vehicle window is a rear windshield.

14. The vehicle of claim 13, further comprising a center high-mounted stop lamp positioned between the sensor housing and the vehicle window.

15. The vehicle of claim 1, further comprising a liftgate that supports the vehicle window and the sensor housing.

16. The vehicle of claim 1, wherein the first image sensor is a camera.

17. The vehicle of claim 16, wherein the first image sensor includes a lens, and the first air outlet is aimed at the lens.

18. The vehicle of claim 17, wherein the sensor housing includes an aperture, the first image sensor has a field of view through the aperture, and the first air outlet is aimed through the aperture.

* * * * *